United States Patent
Trim et al.

(10) Patent No.: US 11,176,818 B2
(45) Date of Patent: Nov. 16, 2021

(54) CLUSTER-BASED MANAGEMENT OF VEHICLE POWER CONSUMPTION

(71) Applicant: International Business Machines Corporation, Armonk, NY (US)

(72) Inventors: Craig M. Trim, Ventura, CA (US); Tanner Mark Preiss, Schnecksville, PA (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 16/401,162

(22) Filed: May 2, 2019

(65) Prior Publication Data

US 2020/0349835 A1 Nov. 5, 2020

(51) Int. Cl.
*G08G 1/09* (2006.01)
*G08G 1/01* (2006.01)
(Continued)

(52) U.S. Cl.
CPC .......... *G08G 1/093* (2013.01); *G08G 1/0112* (2013.01); *G08G 1/0145* (2013.01); *G08G 1/161* (2013.01);
(Continued)

(58) Field of Classification Search
CPC .... G08G 1/093; G08G 1/0112; G08G 1/0145; G08G 1/161; G08G 1/22; H04W 4/38; H04W 4/46; H04W 4/44
See application file for complete search history.

(56) References Cited

U.S. PATENT DOCUMENTS

2013/0211988 A1* 8/2013 Dorn ................ B60L 53/62
705/35
2013/0223303 A1* 8/2013 Nakakuki .......... G08G 1/094
370/310
(Continued)

FOREIGN PATENT DOCUMENTS

GN 108260092 7/2018

OTHER PUBLICATIONS

Zhu et al., "Model of Collaborative UAV Swarm Toward Coordination and Control Mechanisms Study," ICCS 2015 International Conference on Computational Science, vol. 51, 2015, pp. 493-502.
(Continued)

*Primary Examiner* — Peter D Nolan
*Assistant Examiner* — Wae L Louie
(74) *Attorney, Agent, or Firm* — Yee & Associates, P.C.

(57) ABSTRACT

Cluster-based management of vehicle power consumption is provided. Electrical power consumption and processing power consumption of a vehicle is optimized by dynamically determining a cluster of vehicles for the vehicle to join based on input sensor data capturing functions, sensor data processing functions, communication functions, vehicle driving functions, and interior vehicle functions. In response to the vehicle joining the cluster of vehicles, an appropriate proportion of information the vehicle is to process is determined based on current input sensor data capturing functions, sensor data processing functions, and communication functions the vehicle is performing and current power consumption levels the vehicle is using, and current input sensor data capturing functions, sensor data processing functions, and communication functions other vehicles in the cluster of vehicles are performing and current power consumption levels the other vehicles in the cluster are using.

20 Claims, 8 Drawing Sheets

(51) Int. Cl.
  *H04W 4/38*  (2018.01)
  *G08G 1/00*  (2006.01)
  *H04W 4/46*  (2018.01)
  *H04W 4/44*  (2018.01)
  *G08G 1/16*  (2006.01)

(52) U.S. Cl.
  CPC ............... *G08G 1/22* (2013.01); *H04W 4/38* (2018.02); *H04W 4/44* (2018.02); *H04W 4/46* (2018.02)

(56) References Cited

U.S. PATENT DOCUMENTS

| | | | | |
|---|---|---|---|---|
| 2014/0358460 | A1* | 12/2014 | Lee | B60L 58/13 702/63 |
| 2015/0268686 | A1* | 9/2015 | Wu | G05B 15/02 700/291 |
| 2017/0282744 | A1* | 10/2017 | Koo | B60W 50/085 |
| 2019/0011931 | A1* | 1/2019 | Selvam | G08G 1/202 |
| 2019/0025818 | A1* | 1/2019 | Mattingly | G05D 1/0027 |
| 2019/0025819 | A1* | 1/2019 | Ferguson | G05D 1/0088 |
| 2019/0129368 | A1* | 5/2019 | Iacovella | G05B 19/042 |
| 2020/0349835 | A1* | 11/2020 | Trim | G08G 1/0112 |
| 2021/0096224 | A1* | 4/2021 | Lee | G02B 19/0066 |
| 2021/0109544 | A1* | 4/2021 | Rakshit | G05D 1/0297 |

OTHER PUBLICATIONS

Hyatt, "Bosch wants to give self-driving cars hyperlocal road-weather reports," Road Show by CNET, Jul. 25, 2018, accessed Apr. 26, 2019, 8 pages. https://www.cnet.com/roadshow/news/2020-bosch-road-weather-self-driving-autonomous-car-data/.

Miller, "Autonomous Cars Could Drive a Deluge of Data Center Demand," Data Center Frontier, May 24, 2017, accessed Apr. 26, 2019, 19 pages. https://datacenterfrontier.com/autonomous-cars-could-drive-a-deluge-of-data-center-demand/.

* cited by examiner

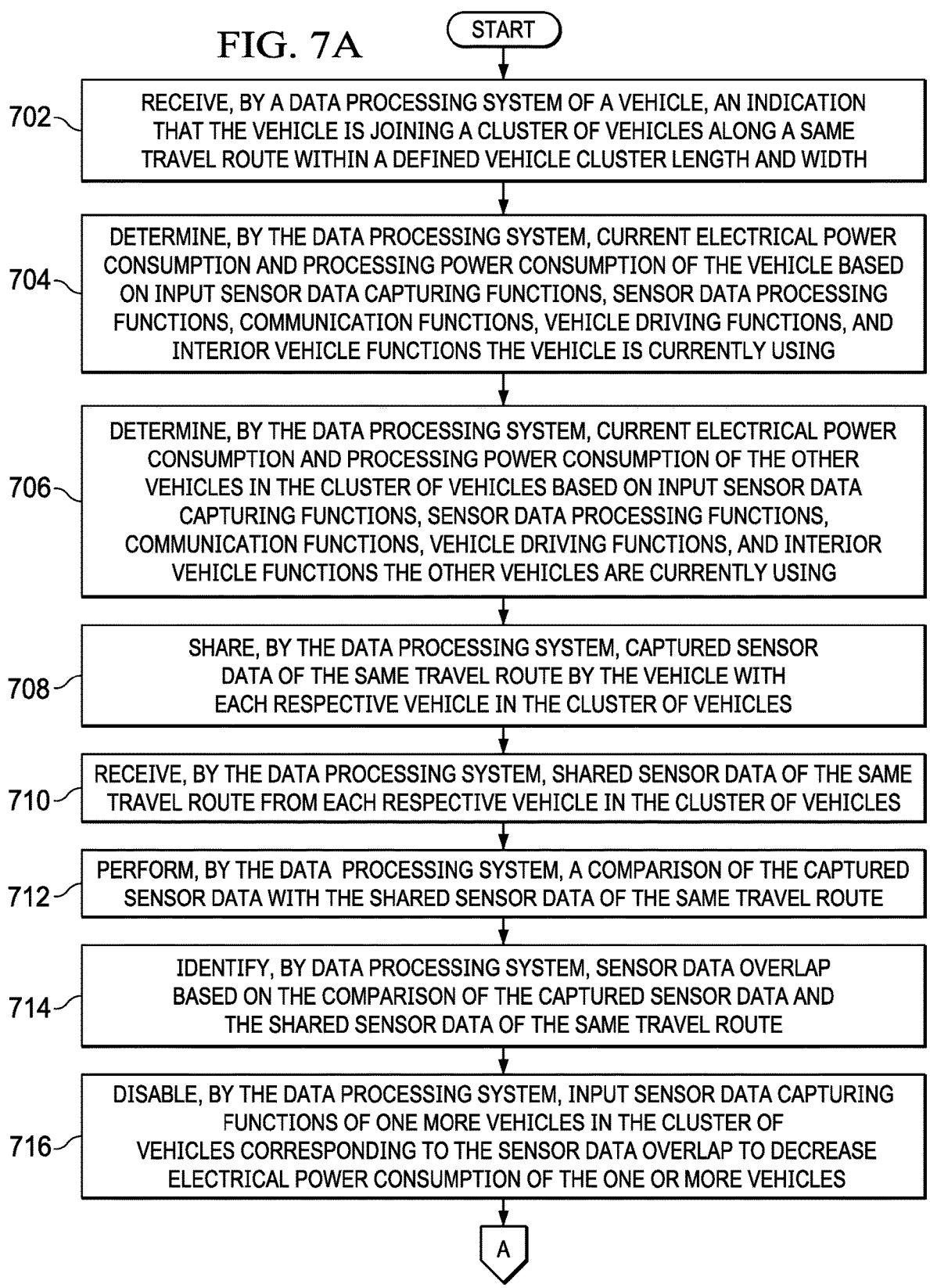

CLUSTER-BASED MANAGEMENT OF VEHICLE POWER CONSUMPTION

BACKGROUND

1. Field

The disclosure relates generally to vehicle power management and more specifically to optimizing electrical power and processing power consumption of vehicles within a cluster of vehicles by decreasing sensor data collection and processing of vehicles in the cluster by using non-duplicate sensor data provided by a designated set of vehicles in the cluster.

2. Description of the Related Art

For the past many years, innovations within the automotive industry have created better performing vehicles. For example, advanced driver-assistance systems have been developed to automate, adapt, and enhance vehicle systems to increase performance and safety. These safety systems are designed to avoid collisions by automatically braking the vehicle or alerting a driver to potential problems. Adaptive features may include, for example, adaptive cruise control, vehicular avoidance systems, pedestrian avoidance systems, automatic lane centering, object detection, automated headlight illumination, automated windshield wiper action, traffic warnings, lane departure warnings, and the like.

Additionally, some advanced vehicles can detect surroundings using a variety of technologies, such as, for example, radar, light detection and ranging (Lidar), global positioning system (GPS) technology, sonar, odometry, and computer vision. Advanced control systems interpret the sensory information provided by these various technologies to identify appropriate navigation paths, as well as, obstacles and relevant signage. These advanced control systems can be used to distinguish between different vehicles on a roadway and determine a path to a desired destination.

SUMMARY

According to one illustrative embodiment, a computer-implemented method for cluster-based management of vehicle power consumption is provided. Electrical power consumption and processing power consumption of a vehicle is optimized by dynamically determining a cluster of vehicles for the vehicle to join based on input sensor data capturing functions, sensor data processing functions, communication functions, vehicle driving functions, and interior vehicle functions. In response to the vehicle joining the cluster of vehicles, an appropriate proportion of information the vehicle is to process is determined based on current input sensor data capturing functions, sensor data processing functions, and communication functions the vehicle is performing and current power consumption levels the vehicle is using, and current input sensor data capturing functions, sensor data processing functions, and communication functions other vehicles in the cluster of vehicles are performing and current power consumption levels the other vehicles in the cluster are using. According to other illustrative embodiments, a computer system and computer program product for cluster-based management of vehicle power consumption are provided.

BRIEF DESCRIPTION OF THE DRAWINGS

FIGS. 7A-7B are a flowchart illustrating a process for cluster-based management of vehicle power consumption in accordance with an illustrative embodiment.

DETAILED DESCRIPTION

Figure 1:
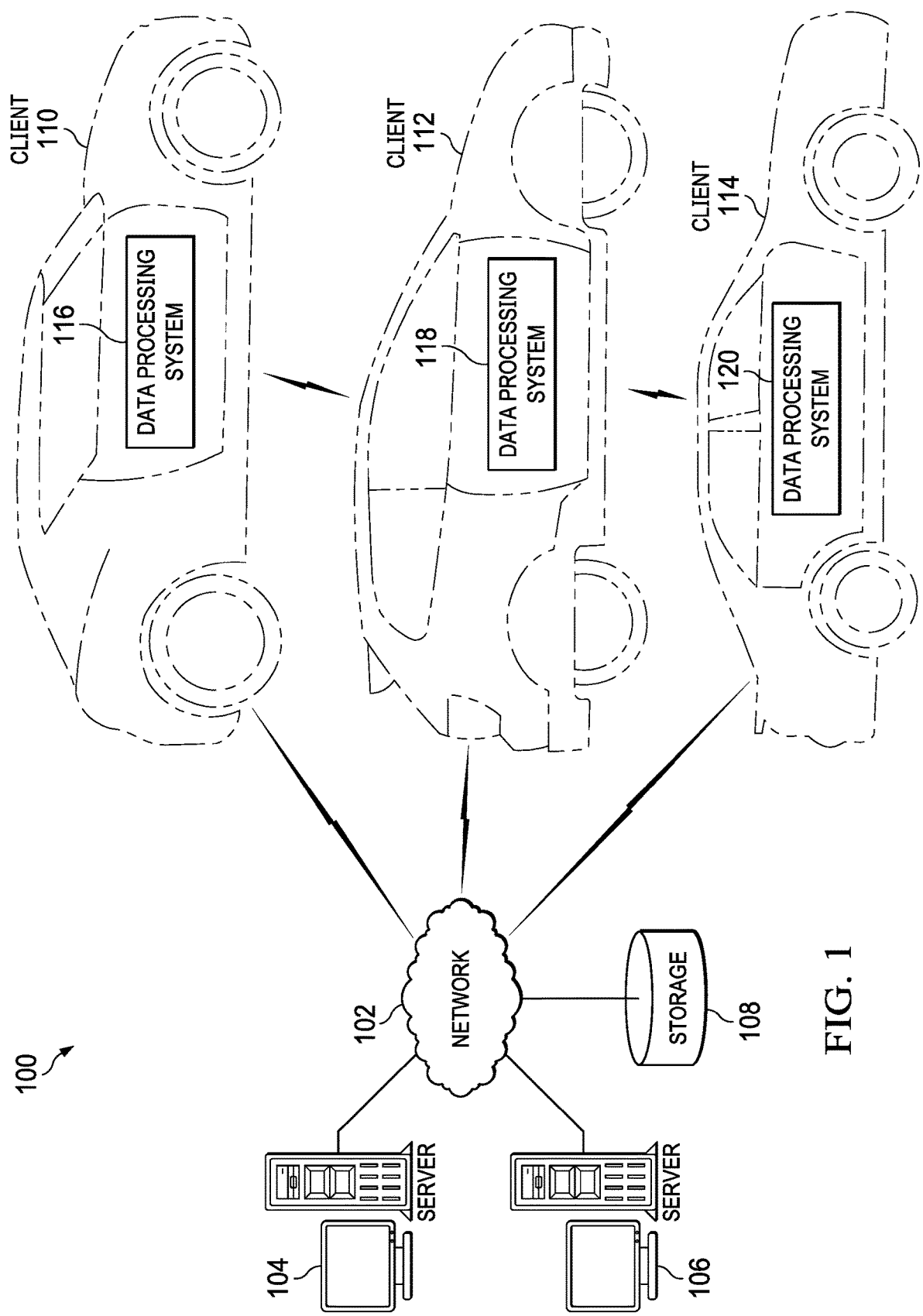
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
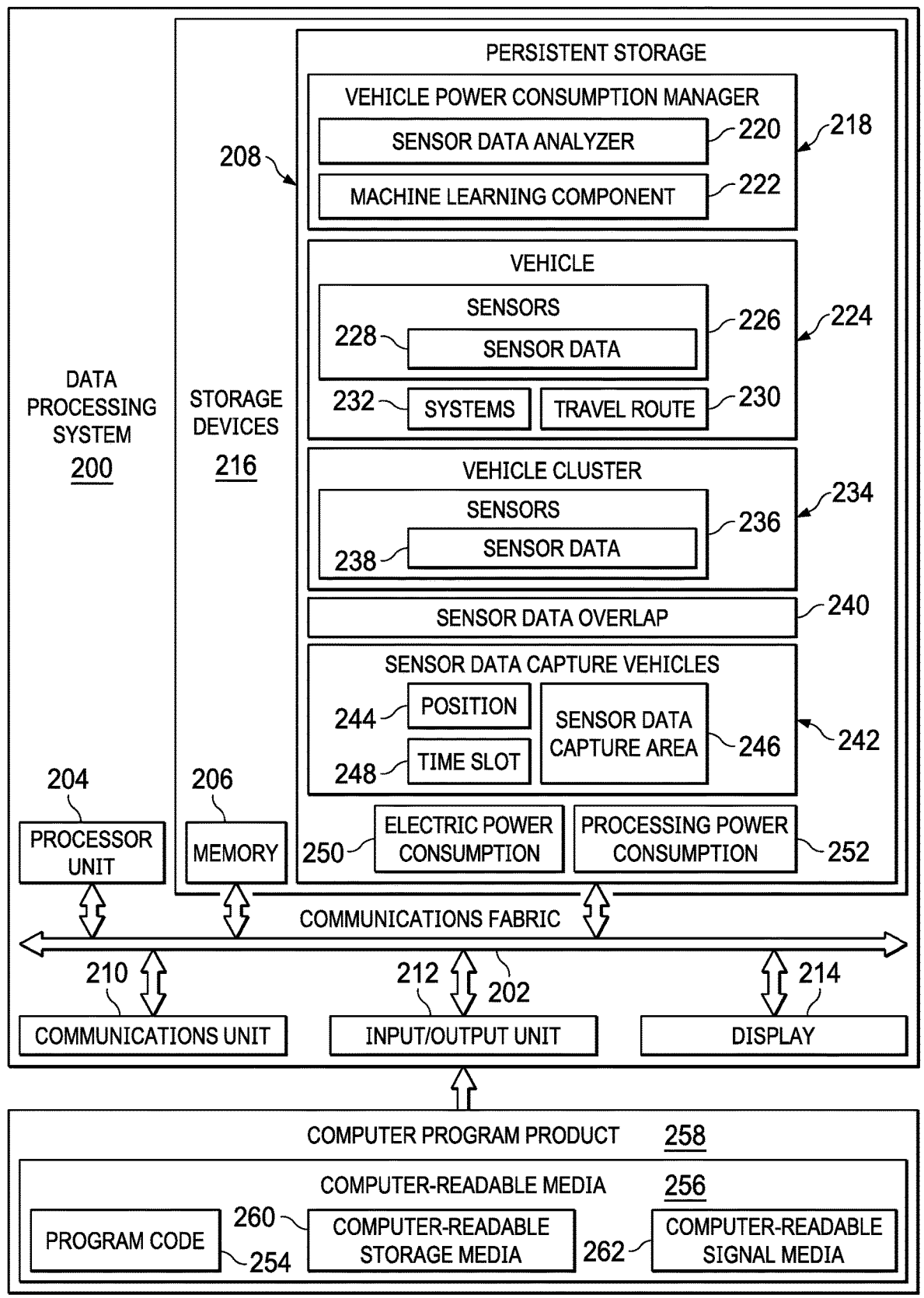
FIG. 2 is a diagram of a data processing system in which illustrative embodiments may be implemented.
Figure 3:
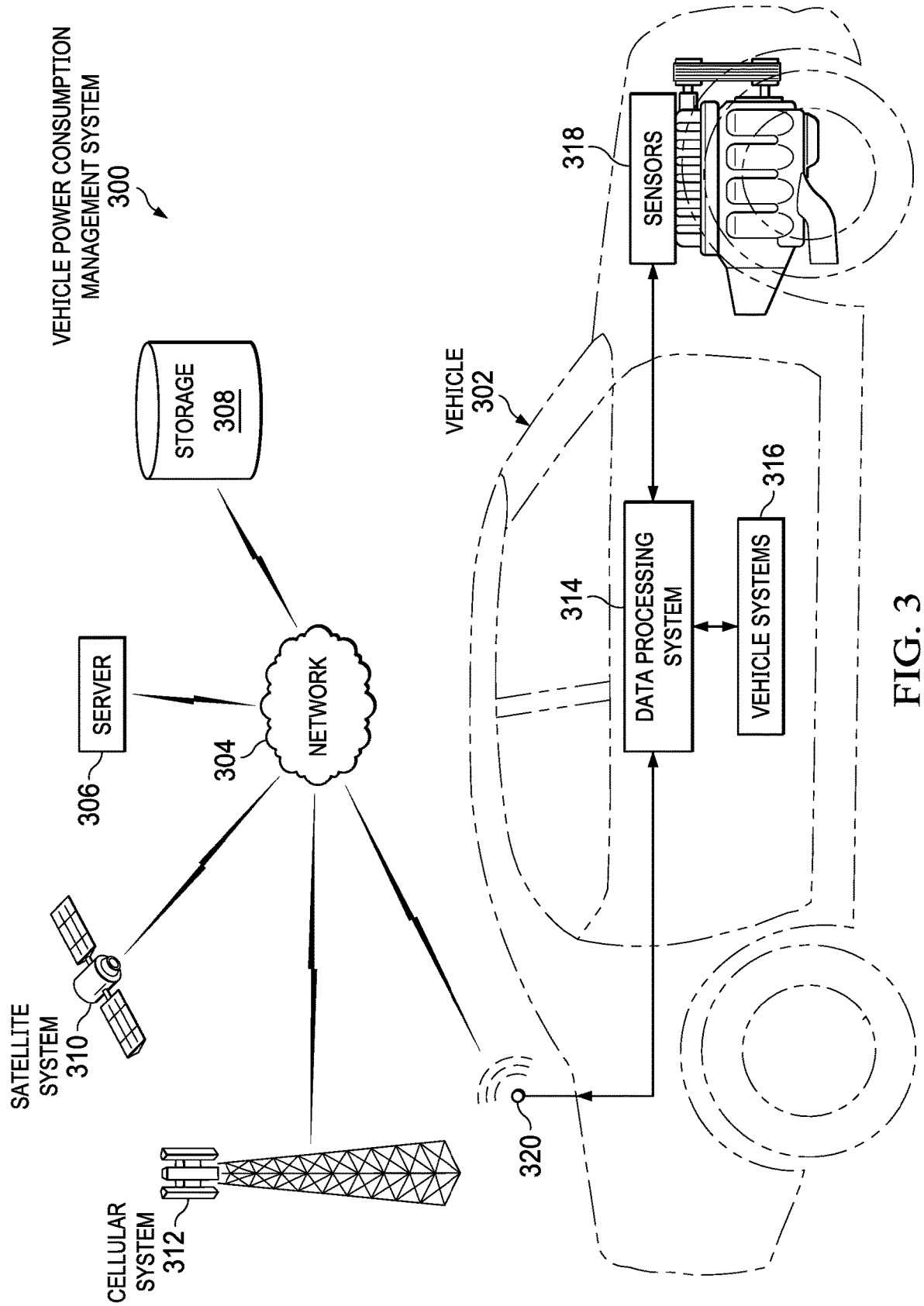
FIG. 3 is a diagram illustrating an example of a vehicle power consumption management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wireless communication links, wire communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, telematics services, road safety services, event monitoring services, data services, map services, navigation services, communication services, weather services, traffic services, and the like, to registered client vehicles. Server 104 and server 106 may also provide other information, such as, for example, operating system images, software applications and programs, software updates, software patches, and the like, to these registered client vehicles. Further, server 104 and server 106 may represent clusters of servers in a data center. Alternatively, server 104 and server 106 may represent computing nodes in a cloud environment.

Client 110, client 112, and client 114 also connect to network 102. Clients 110, 112, and 114 are vehicles that include onboard data processing systems, such as data processing system 116, data processing system 118, and data processing system 120, respectively. Data processing systems 116, 118, and 120 provide the data processing capabilities of clients 110, 112, and 114. Clients 110, 112, and 114 may represent any type of land-based vehicle, such as, for example, a car, van, sport utility vehicle, truck, semi-tractor trailer, taxi, bus, and the like. However, it should be noted that clients 110, 112, and 114 may also represent other types of vehicles, such as, for example, air-based vehicles and water-based vehicles. Further, clients 110, 112, and 114 may represent human-operated vehicles, semi-autonomous vehicles, or autonomous vehicles. Furthermore, clients 110, 112, and 114 are capable of peer-to-peer communication. Moreover, clients 110, 112, and 114 utilize the peer-to-peer communication to form a cluster or group of collaborating vehicles to optimize electrical and processing power consumption of each vehicle in the cluster while traveling together as a group.

Storage 108 is a network storage device capable of storing any type of data in a structured format or an unstructured format. Storage 108 may also represent a plurality of network storage devices connected to network 102. Storage 108 may store information, such as, for example, lists of registered client vehicles with identifiers and specification information, along with associated vehicle operation control information, GPS information, maps, and the like. Further, storage 108 may store other types of data, such as authentication or credential data that may include user names, passwords, and biometric templates associated with client vehicle users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to data processing system 116 of client 110 over network 102 for use on data processing system 116.

In the depicted example, network data processing system 100 may be implemented as a number of different types of communication networks, such as, for example, a telecommunications network, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as data processing system 116 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, or some combination of the above. The media used by persistent storage 208 may be removable. For example, a removable hard drive may be used for persistent storage 208.

In this example, persistent storage 208 stores vehicle power consumption manager 218. However, it should be noted that even though vehicle power consumption manager 218 is illustrated as residing in persistent storage 208, in an alternative illustrative embodiment vehicle power consumption manager 218 may be a separate component of data processing system 200. For example, vehicle power consumption manager 218 may be a hardware component coupled to communication fabric 202 or a combination of hardware and software components. In another alternative illustrative embodiment, a first set of components of vehicle power consumption manager 218 may be located in data processing system 200 and a second set of components of vehicle power consumption manager 218 may be located in a second data processing system, such as, for example, server 104 in FIG. 1.

Vehicle power consumption manager 218 controls the process of optimizing electrical power consumption and processing power consumption of a vehicle, such as client 110 in FIG. 1, which is one vehicle in a cluster of two or more vehicles. Vehicle power consumption manager 218 optimizes the processing power consumption of the vehicle by decreasing sensor data processing of the vehicle by using non-duplicate sensor data provided by one or more other vehicles in the cluster. Further, vehicle power consumption manager 218 may optimize the electrical power consumption of the vehicle by disabling one or more sensors of the vehicle that would otherwise be providing duplicate sensor data that is already being provided by the one or more other vehicles in the cluster.

In this example, vehicle power consumption manager 218 includes sensor data analyzer 220 and machine learning component 222. Vehicle power consumption manager 218 utilizes sensor data analyzer 220 to perform sensor data (e.g., video images) comparison and matching, which are captured by sensors of the vehicle and sensors of the other vehicles in the cluster, to determine sensor data overlap (i.e., duplicate sensor data being captured by one or more vehicles in the cluster). Machine learning component 222 may be, for example, an artificial intelligence program. Vehicle power consumption manager 218 utilizes machine learning component 222 to analyze, classify, and learn collected sensor data patterns for management and optimization of electrical power consumption and processing power consumption of vehicles in the cluster of vehicles.

Vehicle 224 represents an identifier and corresponding specification information for the particular vehicle that data processing system 200 is located within. Sensors 226 represent a set of one or more sensor devices corresponding to vehicle 224. Sensors 226 may include, for example, one or more imaging devices, sonar devices, radar devices, Lidar devices, GPS devices, and the like. Sensor data 228 represent captured input sensor data of travel route 230 from respective sensors in sensors 226. For example, imaging devices, such as one or more cameras, may capture images of the roadway corresponding to travel route 230 and the area surrounding vehicle 224. Travel route 230 represents the route or path that vehicle 224 is traveling along to a desired destination.

Systems 232 represent subsystems of vehicle 224 that vehicle power consumption manager 218 receives data and information from regarding, for example, current status and settings of systems 232. Systems 232 may include, for example, a speed regulation system (e.g., cruise control system), navigation system, GPS system, braking system, steering system, communication system, electrical power system, processing power system, fuel consumption system, and the like. In addition, vehicle power consumption manager 218 may automatically control one or more systems of systems 232 to manage and optimize electrical power consumption and processing power consumption of vehicle 224.

Vehicle cluster 234 represents a group of two or more vehicles acting collaboratively to optimize electrical and processing power consumption of each respective vehicle comprising vehicle cluster 234. It should be noted that vehicle 224 is included in vehicle cluster 234. Sensors 236 represent sensor devices corresponding to other vehicles (i.e., other than vehicle 224) in vehicle cluster 234. Sensors 236 may be the same or similar to sensors 226 or may include a combination of same and different types of sensor devices. Sensor data 238 represent captured input sensor data of travel route 230 from respective sensors in sensors 236 of the other vehicles in vehicle cluster 234.

Sensor data overlap 240 represents the overlap or duplication of sensor data between sensor data 228 and sensor data 238. Sensor data analyzer 220 identifies sensor data overlap 240 by analyzing and comparing sensor data 228 and sensor data 238 for commonality. Vehicle power consumption manager 218 may disable one or more sensors of sensors 226 to eliminate or reduce sensor data overlap 240 and, thereby, decrease electrical power consumption in vehicle 224. Alternatively, vehicle power consumption manager 218 may direct one or more other vehicles in vehicle cluster 234 to disable one or more sensors of sensors 236 to eliminate or reduce sensor data overlap 240.

As a result, vehicle power consumption manager 218 designates sensor data capture vehicles 242 in vehicle cluster 234 to capture sensor data corresponding to travel route 230. Sensor data capture vehicles 242 represent a set of vehicles positioned within vehicle cluster 234 to effectively cover the road operating sensor data needs of all vehicles in vehicle cluster 234. It should be noted that the set of vehicles does not include all vehicles in vehicle cluster 234. In other words, the set of vehicles is a subgroup or subcluster of vehicles within vehicle cluster 234. Position 244 represents a geolocation (e.g., GPS coordinates) of each respective vehicle in vehicle cluster 234.

Vehicle power consumption manager 218 assigns sensor data capture area 246 to each respective vehicle in sensor data capture vehicles 242. Sensor data capture area 246 represents a defined sensor data collection boundary of each respective vehicle in sensor data capture vehicles 242. In addition, vehicle power consumption manager 218 assigns time slot 248 to each respective vehicle in sensor data capture vehicles 242. Time slot 248 represents a defined amount of time that each respective vehicle in sensor data capture vehicles 242 is to capture sensor data for vehicle cluster 234. Vehicle power consumption manager 218 utilizes time slot 248 to equally distribute, as nearly as possible, the sensor data capture and processing workload among the vehicles in vehicle cluster 234.

At expiration of time slot 248 for each respective vehicle in sensor data capture vehicles 242, vehicle power consumption manager 218 designates a new set of sensor data capture vehicles and may instruct one or more vehicles in vehicle cluster 234 to move to a new position 244 within vehicle cluster 234. Repositioning vehicles within vehicle cluster 234 allows other vehicles to start sensor data capture and processing and allows vehicles with an expired time slot to stop sensor data capture and processing.

Electrical power consumption 250 represents an amount of electrical power that each particular vehicle in vehicle cluster 234 is currently using and has used corresponding to travel route 230. Processing power consumption 252 represents an amount of processing power that each particular vehicle in vehicle cluster 234 is currently using and has used corresponding to travel route 230. Vehicle power consumption manager 218 monitors electrical power consumption 250 and processing power consumption 252 to determine equal distribution of the electrical and processing power workload among all vehicles in vehicle cluster 234 and to determine time slot 248 for each respective vehicle in vehicle cluster 234.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Today's vehicles use large amounts of electrical power to run onboard sensors and perform all the calculations needed to analyze the world around them and make driving decisions. However, this large amount of electrical power consumption may cause issues. A production vehicle that a consumer can buy today, with just cameras and radar, may generate approximately six gigabytes of data every thirty seconds. The amount of generated data for self-driving vehicles, with additional sensors like Lidar, is even greater. All of this generated data needs to be combined, sorted, and turned into a usable picture of a driving environment, with instructions on how to move through that environment. This takes a huge amount of processing power, which means huge electricity demands.

Illustrative embodiments provide a peer-to-peer, cluster-based solution to address the electrical demands of processing large amounts of generated data by these vehicles. Illustrative embodiments enable these vehicles to communicate and collaborate with one another. Currently, each vehicle collects data from its immediately surrounding environment. Thus, other vehicles located in the same area are capturing same or similar sensor data. As a result, much of the onboard vehicle sensor data processing is duplicated from vehicle to vehicle in a given area.

Illustrative embodiments allow vehicles within a defined cluster of vehicles to communicate and collaborate with each other. This collaboration between vehicles decreases the total amount of electrical power consumed by each vehicle in the cluster and helps mitigate issues associated with large electrical power demands for processing large amounts of generated data, such as, for example, increased fuel consumption by gas-powered vehicles and decreased battery life in battery-powered vehicles, both of which decrease vehicle range.

Collaborating vehicles in a vehicle cluster capture non-duplicate data from the surrounding area, and dynamically decide on a set of one or more vehicles in the cluster to process the non-duplicate data on-behalf of the other vehicles in the cluster. Accordingly, each participating vehicle in the cluster is operating in a collaborative manner on the road. Participating vehicles identify overlapping fields of sensor viability with each other to identify duplicate data being collected in the area surrounding the cluster of vehicles. After identifying the overlapping fields of sensor viability, collaborating vehicles in the cluster select a set of one or more vehicles to capture the sensor data of the surrounding area so that the same data (i.e., duplicate sensor data) is not obtained by the other vehicles in the cluster.

Based on duration of time traveling together along the same route, collaborating vehicles dynamically identify a time slot for each vehicle in the cluster to process the generated data, so that each vehicle in the cluster is participating in the processing of the captured sensor data and total electrical power consumption is approximately equally distributed. Based on the profile of the road (e.g., turns, visibility, lanes, construction, and the like) and number of participating vehicles in the cluster, each vehicle in the cluster dynamically decides how many vehicles need to process the generated data. Thus, the cluster of vehicles determine the number of vehicles needed to capture and process the sensor data for that particular section of road and store that information for future reference. The vehicles may determine the profile of the road based on, for example, navigation data, map data, road data collected by the vehicles in the cluster, historic road data stored by the vehicles, and the like. When a vehicle in the cluster needs to change route, then before that vehicle exits the cluster, the other participating vehicles ensure that one or more remaining vehicles can capture the data previously captured by the existing vehicle. In addition, the exiting vehicle seamlessly takes over control of its own sensor data capture and processing.

One illustrative embodiment utilizes an ad hoc centralized platform approach. For example, co-located, collaborating vehicles in a cluster elect a single vehicle in the cluster to act as the ad hoc centralized platform (e.g., master or primary vehicle) for computing travel solutions for all member vehicles of the cluster. The ad hoc centralized platform controls size of the vehicle cluster based on computational limits of the centralized platform. Averaged over time, such as weeks, months, and years, participating vehicles will equally share the computational burden for a cluster as nearly as possible, but each participating vehicle averaged over weeks, months, and years should enjoy lower computational burden since illustrative embodiments minimize duplicate sensor data capture and processing.

Another illustrative embodiment utilizes a collaborative vehicle cluster approach. For example, co-located, collaborating vehicles form a cluster (e.g., group or swarm) of vehicles for sharing travel solution data. The cluster of vehicles analyzes the data capture boundaries of each vehicle in the cluster to determine duplication of sensor data and deletes or archives duplicate sensor data. In addition, the cluster of vehicles analyzes travel solution requirements, such as travel destination and other travel parameters of each vehicle in the cluster, for commonality and deletes redundant travel solutions or solution components. Vehicles in that cluster will share the common solution that resides in the vehicle that either plotted the common solution first or has the greatest stake in the common solution (e.g., the master vehicle in the cluster that initiated the common solution sequence).

Thus, illustrative embodiments enable vehicles to form clusters of vehicles, each vehicle in a cluster is able to collectively offload data management from solely focused to a shared greater initiative. Further, illustrative embodiments minimize the overall quantity of sensor data collected and processed by each vehicle in a cluster, while maximizing sensor data quality for that cluster of vehicles in order to optimize cluster-based vehicle power consumption. Furthermore, illustrative embodiments provide an ability to manage all data requirements regarding inclusion of any and all new vehicles into a cluster and removal of any vehicle from the cluster.

It should be noted that any type of land vehicles, such as human-operated vehicles, semi-autonomous vehicles, and autonomous vehicles, may utilize different illustrative embodiments. In addition, autonomous aerial vehicles and autonomous watercraft, such as drones, may utilize different illustrative embodiments. For example, a cluster of drones may utilize illustrative embodiments for pattern-based power consumption optimization and potential battery life extension. Autonomous utility mission-based vehicles, such as autonomous lawnmowers for cutting large areas of grass or autonomous farm machinery for harvesting crops, may utilize illustrative embodiments to collectively work together as a clustered group and optimize power consumption. Autonomous service-based vehicles, such as vacuuming robots for vacuuming large areas, may utilize illustrative embodiments to collectively work together as a clustered group and optimize power consumption.

Each vehicle has an input sensor system for capturing data corresponding to the area surrounding the vehicle. The input sensor system may include, for example, radar, sonar, Lidar, a set of one or more cameras, such as still picture cameras, video cameras, and infrared cameras, and the like. Power consumption required by each vehicle is equal to input sensor data capture cost, plus input sensor data processing cost, plus communication cost, plus required vehicle driving cost, and interior vehicle functions cost. Using vehicle collaboration, illustrative embodiments decrease total power required for input sensor data capture and processing by each vehicle in the cluster.

When illustrative embodiments plan for vehicles to travel together as a cluster to optimize power consumption, illustrative embodiments instruct each of the vehicles in the cluster to move closer together so that the distance between any pair of vehicles in the cluster is at a minimum safe distance. This reduction of space between vehicles in the cluster helps the vehicles eliminate data collected from empty spaces and reduces the total volume of data collected. In addition, vehicles in the cluster communicate with each other and share collected data, such as, for example, camera images. Vehicles in the cluster may utilize image matching technology to identify overlapping image capture areas and determine which vehicles in the cluster are capturing overlapping images. Image analysis systems identify high definition images and illustrative embodiments select those vehicles in the cluster taking these high definition images for image capture.

Illustrative embodiments may direct a set of one or more vehicles in the cluster to disable one or more of their input sensor devices because that set of vehicles is capturing the same sensor data as one or more other vehicles in the cluster. Vehicles forming the cluster will identify the length and width of the cluster based on processing power or computational limits. Illustrative embodiments analyze the captured sensor data to make driving decisions. In this case, illustrative embodiments analyze all of the captured sensor data together and select one or more vehicles of the cluster to use the data processing memory to make the driving decisions. In response to completing the processing of the input sensor data, the selected set of vehicles in the cluster make the driving decisions for the entire cluster of vehicles and the other vehicles follow the driving decisions or instructions.

Illustrative embodiments determine the position of each vehicle in the cluster based on GPS data and travel route corresponding to each vehicle so that when a particular vehicle needs to exit the cluster, there is minimum disturbance to the remaining cluster of vehicles. Each vehicle shares its travel route with each of the other vehicles in the cluster and, accordingly, illustrative embodiments identify journey duration. Once illustrative embodiments identify journey duration, then illustrative embodiments identify appropriate data processing time slots for vehicles in the cluster so that each vehicle in the cluster is processing captured sensor data only during its respective time slot. Thus, each vehicle in the cluster gets the benefit of power savings.

When any vehicle needs to exit the cluster, then the remaining vehicles in the cluster validate whether sensor data capture can be properly performed by one or more other vehicles remaining in the cluster. The vehicle exiting the cluster gradually enables all of its input sensor devices and processes the captured sensor data for making self-driving decisions, for example.

Thus, illustrative embodiments provide one or more technical solutions that overcome a technical problem with managing and optimizing power consumption of each respective vehicle in a cluster of collaborating vehicles traveling along a same route. As a result, these one or more technical solutions provide a technical effect and practical application in the field of vehicle power management and optimization.

With reference now to FIG. 3, a diagram illustrating an example of a vehicle power consumption management system is depicted in accordance with an illustrative embodiment. Vehicle power consumption management system 300 may be implemented in a network of data processing systems, such as network data processing system 100 in FIG. 1. Vehicle power consumption management system 300 is a system of hardware and software components for optimizing electrical and processing power consumption of each respective vehicle in a cluster of vehicles.

In this example, vehicle power consumption management system 300 includes vehicle 302, network 304, server 306, storage 308, satellite system 310, and cellular system 312. However, it should be noted that vehicle power consumption management system 300 is intended as an example only and not as a limitation of illustrative embodiments. In other words, vehicle power consumption management system 300 may include any number of vehicles and other components connected to network 304.

Vehicle 302 may be, for example, client 110 in FIG. 1. Also, it should be noted that vehicle 302 may represent any type of land-based, air-based, or water-based vehicle that is capable of participating in a cluster of collaborating vehicles of same or similar type. In addition, vehicle 302 may represent a human-operated vehicle, a semi-autonomous vehicle, or an autonomous vehicle. Further, vehicle 302 may represent a plurality of vehicles of same or similar type connected to network 304.

In this example, vehicle 302 includes data processing system 314, vehicle systems 316, sensors 318, and antenna 320. However, it should be noted that vehicle 302 may include other systems and devices not shown. Data processing system 314 may be, for example, data processing system 116 in FIG. 1 or data processing system 200 in FIG. 2. Data processing system 314 provides the data processing capabilities of vehicle 302 and is communicatively coupled to vehicle systems 316, sensors 318, and antenna 320.

Vehicle systems 316 represent subsystems of vehicle 302. Vehicle systems 316 may include, for example, a speed control system, a navigation system, a GPS, a braking system, a steering system, a communication system, and the like. Data processing system 314 collects data and information from vehicle systems 316. For example, the GPS may provide coordinates for identification of the current geographic location of vehicle 302 and the navigation system may provide a route of travel for vehicle 302 to a desired destination. In addition, data processing system 314 may automatically control one or more systems of systems 316 in response to analysis of data captured by sensors 318 along the route of travel for vehicle 302.

Sensors 318 represent a set of one or more types of sensors for monitoring a roadway that vehicle 302 is currently traveling on. Sensors 318 also monitor other vehicles on the roadway that are within a defined sensor range of vehicle 302. Sensors 318 may include, for example, one or more of imaging sensors, motion sensors, sound detection sensors, lane departure sensors, collision avoidance sensors, radar sensors, sonar sensors, Lidar sensors, and the like.

Vehicle 302 may use antenna 320 to send data to and receive data from server 306, storage 308, satellite system 310, and cellular system 312. Even though antenna 320 is depicted as an external antenna in this example, antenna 320 may be an internal antenna located in, for example, a communication unit, such as communications unit 210 in FIG. 2, within data processing system 314. Further, it should be noted that any form of wireless communication, such as, for example, radio transmission, microwave transmission, cellular telephone transmission, wireless Web transmission, Wi-Fi transmission, Bluetooth transmission, or any combination thereof, may be employed for communication purposes within and between the different components comprising vehicle power consumption management system 300.

Network 304 may be, for example, network 102 in FIG. 1. Network 304 provides communication between vehicle 302, server 306, storage 308, satellite system 310, and cellular system 312. However, it should be noted that network 304 may provide communication with other vehicle data processing systems and devices not shown. Further, vehicle 302 is capable of peer-to-peer communication with other vehicles in a cluster of vehicles that vehicle 302 is a member of.

Server 306 may provide information and/or telematic services to vehicle 302. Vehicle 302 is a client of server 306. In addition, server 306 may collect and track information received from vehicle 302. Server 306 may be, for example, server 104 in FIG. 1. In addition, server 306 may represent a plurality of server computers connected to network 304.

Storage 308 may be, for example, storage 108 in FIG. 1. Storage 308 may store, for example, identifiers for a plurality of vehicles, specification information corresponding to the plurality of vehicles, operational control information corresponding to the plurality of vehicles, maps, and the like. In addition, storage 308 may represent a plurality of different storage devices connected to network 304.

Satellite system 310 may be, for example, a network of GPS satellites. GPS is a satellite-based radio navigation system. GPS is designed so that signals from at least four satellites are available anywhere on earth, which are sufficient to compute the current geographic location of a GPS transceiver located in vehicle 302.

Cellular system 312 may be, for example, a network of regional, national, or global cellular telephone equipment provided by a public or private telecommunications carrier. The cellular telephone equipment may include, for example, a network of cell towers, Evolved Node B towers, and/or satellites. Vehicle 302 may use cellular system 312 for sending and receiving data, as well as for voice and textual communication purposes. In addition, vehicle 302 may utilize cellular system 312 to provide temporary geographic location data when, for example, GPS data signals are not available from satellite system 310.

Figure 4:
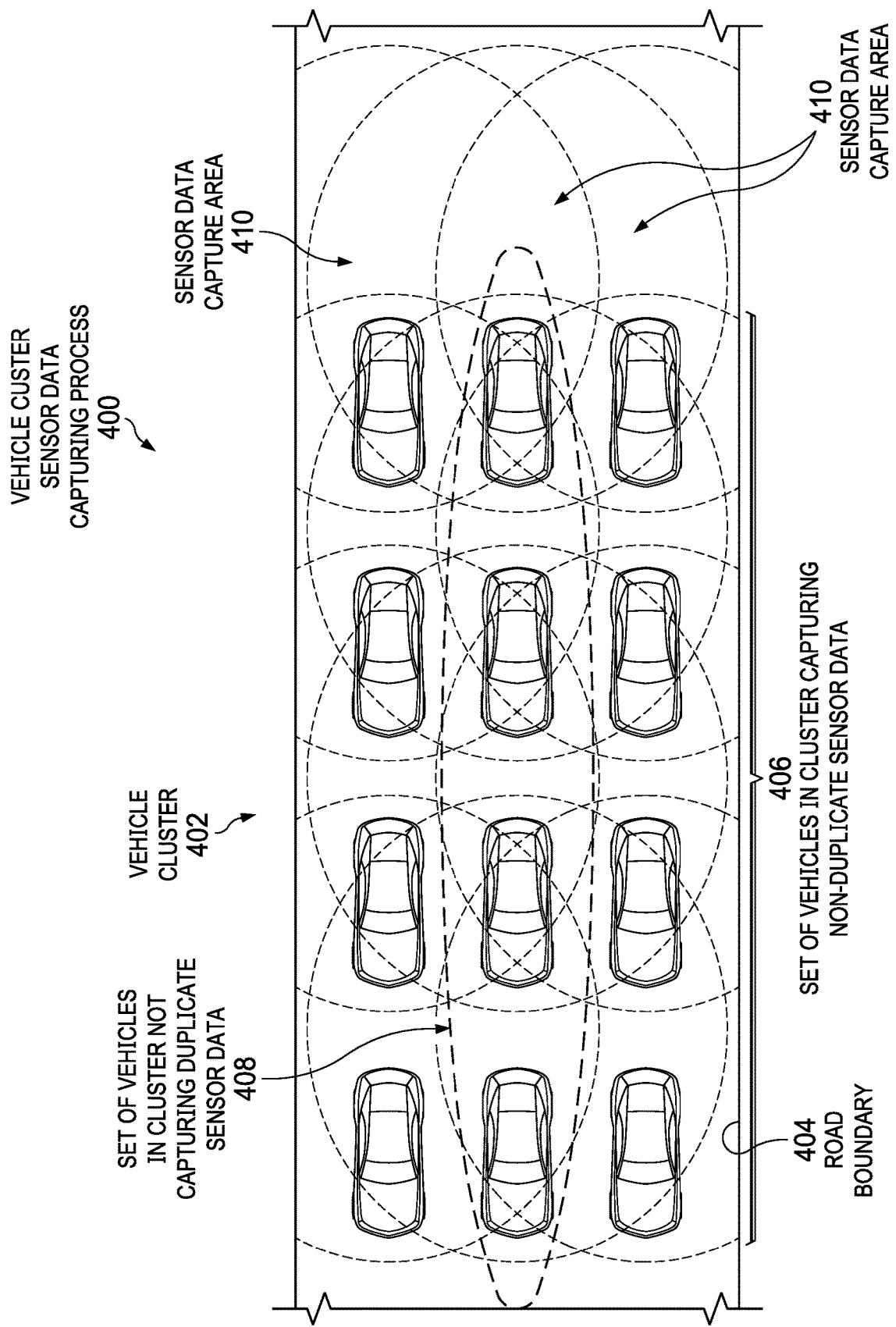
FIG. 4 is a diagram illustrating an example of a vehicle cluster sensor data capturing process in accordance with an illustrative embodiment.

With reference now to FIG. 4, a diagram illustrating an example of a vehicle cluster sensor data capturing process is depicted in accordance with an illustrative embodiment. Vehicle cluster sensor data capturing process 400 is implemented in vehicle cluster 402, which is comprised of a plurality of vehicles. Vehicle cluster 402 may be, for example, vehicle cluster 234 in FIG. 2.

In this example, vehicle cluster 402 is comprised of twelve vehicles collaboratively operating in a three by four configuration within road boundary 404. However, it should be noted that vehicle cluster 402 is only meant as an example and not as a limitation on illustrative embodiments. In other words, vehicle cluster 402 may be comprised of any number of vehicles and may be of any length and width, depending on processing power limitations and road conditions (e.g., number of lanes traveling in same direction).

In this example, vehicle cluster 402 includes set of vehicles in cluster capturing non-duplicate sensor data 406 and set of vehicles in cluster not capturing duplicate sensor data 408. Set of vehicles in cluster capturing non-duplicate sensor data 406 represent a first number of vehicles (eight in this example) within vehicle cluster 402 that are capturing non-duplicate sensor data for vehicles in vehicle cluster 402. Set of vehicles in cluster not capturing duplicate sensor data 408 represent a second number of vehicles (four in this example) within vehicle cluster 402 that are not capturing duplicate sensor data (i.e., same type of sensor data being captured by set of vehicles in cluster capturing non-duplicate sensor data 406), but still may be capturing other types of sensor data for safe operation on the roadway.

Each respective vehicle in vehicle cluster 402 has a corresponding sensor data capture area 410. Vehicle cluster sensor data capturing process 400 illustrates overlap between different sensor data capture areas. Thus, vehicles in set of vehicles in cluster not capturing duplicate sensor data 408 may disable one or more sensors that would otherwise be capturing duplicate sensor data as sensors of vehicles in set of vehicles in cluster capturing non-duplicate sensor data 406.

Set of vehicles in cluster capturing non-duplicate sensor data 406 capture surrounding context within road boundary 404 based on, for example, vehicle speed, weather conditions, type of vehicles, and the like. When multiple vehicles are operating on a roadway and each of these vehicles is operating individually, then a majority of the surrounding context is captured by each of the vehicles. As a result, the same data is processed in each vehicle individually. However, collaborating vehicles within vehicle cluster 402 take responsibility for capturing sensor data in designated sensor data capture areas and share the captured sensor data with the other vehicles in the cluster. Consequently, sensor data processing is performed by only a few vehicles in vehicle cluster 402. Each respective vehicle in vehicle cluster 402 performs sensor data matching with sensor data captured by each of the other vehicles and, therefore, identify which vehicles are to capture sensor data in which areas, and which sensors are to be enabled for sensor data capture and which sensors are to be disabled for electrical power conservation.

Figure 5:
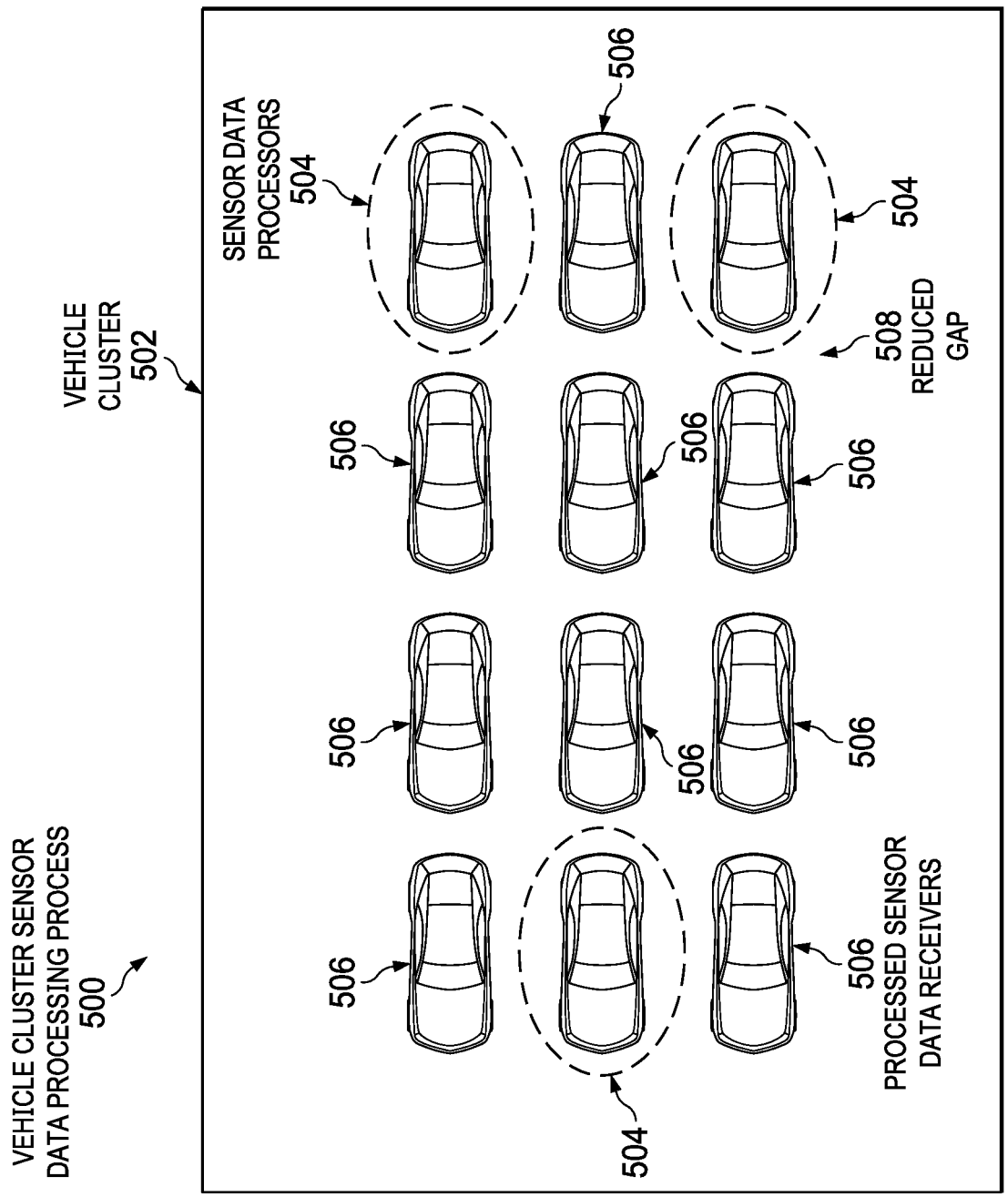
FIG. 5 is a diagram illustrating an example of a vehicle cluster sensor data processing process in accordance with an illustrative embodiment.

With reference now to FIG. 5, a diagram illustrating an example of a vehicle cluster sensor data processing process is depicted in accordance with an illustrative embodiment. Vehicle cluster sensor data processing process 500 is implemented in vehicle cluster 502, such as, for example, vehicle cluster 402 in FIG. 4.

In this example, vehicle cluster 502 is comprised of sensor data processors 504 and processed sensor data receivers 506. Sensor data processors 504 represent a first number of vehicles (three in this example) within vehicle cluster 502 that are currently performing the sensor data processing workload for the other vehicles in vehicle cluster 502 (i.e., processed sensor data receivers 506). Processed sensor data receivers 506 represent a second number of vehicles (nine in this example) that receive the sensor data processed by sensor data processors 504.

Vehicle cluster 502 illustrates reduced gap 508 between any pair of vehicles within vehicle cluster 502. Thus, reduced gap 508 increases proximity of one vehicle with another within vehicle cluster 502. As a result, the sensor data capture area is decreased and, therefore, electrical and processing power consumption is decreased. The entire cluster of vehicles is considered as a single vehicle and moves together. Vehicle cluster sensor data processing process 500 can change position of vehicles in vehicle cluster 502 based on equal distribution of sensor data capture and processing workload or when one or more vehicles leave vehicle cluster 502. In addition, based on assigned time slots, vehicle cluster sensor data processing process 500 can switch sensor data processing to other vehicles so that approximately each vehicle in vehicle cluster 502 is benefitted with shared processing of captured non-duplicate sensor data.

Figure 6:
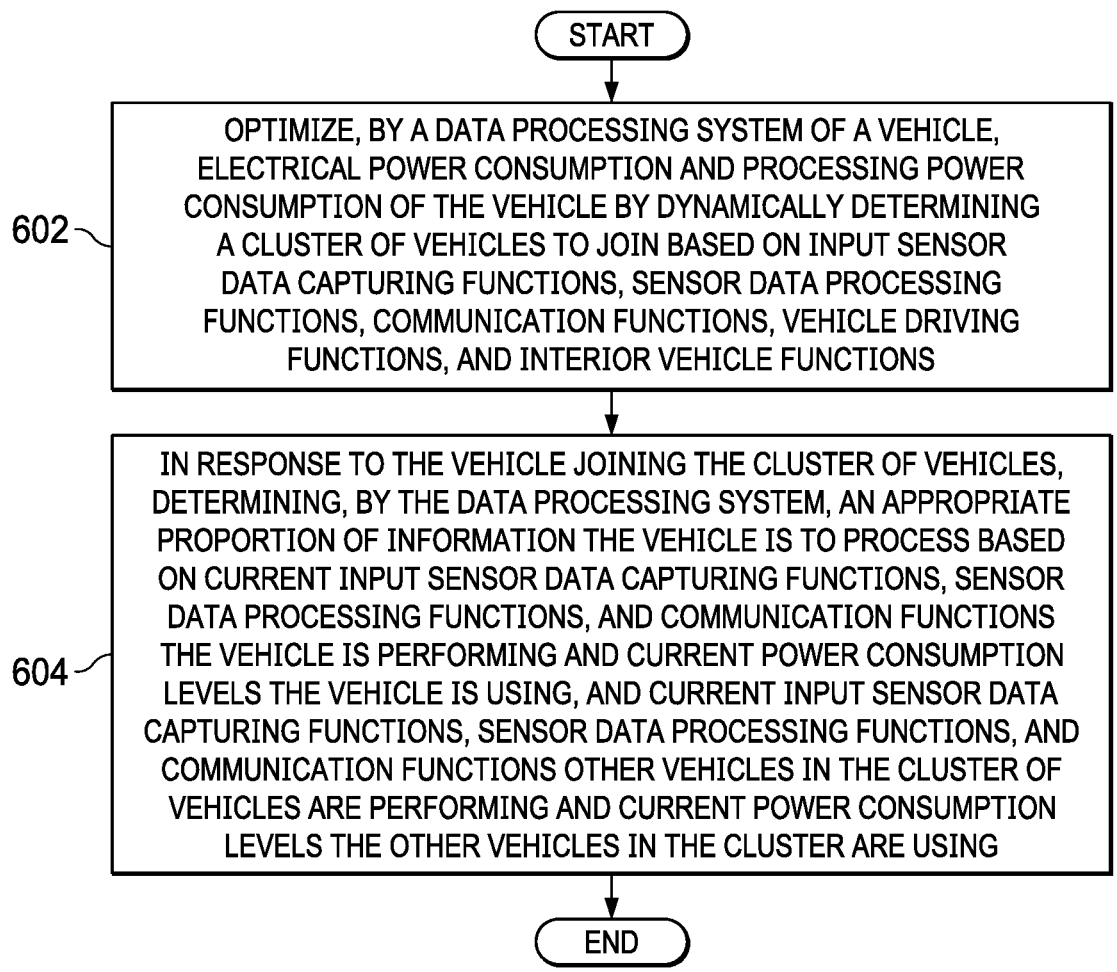
FIG. 6 is a flowchart illustrating a process for determining an appropriate proportion of vehicle sensor data processing in accordance with an illustrative embodiment.

With reference now to FIG. 6, a flowchart illustrating a process for determining an appropriate proportion of vehicle sensor data processing is shown in accordance with an illustrative embodiment. The process shown in FIG. 6 may be implemented in a data processing system of a vehicle, such as, for example, data processing system 116 in FIG. 1, data processing system 200 in FIG. 2, or data processing system 314 in FIG. 3.

The process begins when the data processing system optimizes electrical power consumption and processing power consumption of the vehicle by dynamically determining a cluster of vehicles to join based on input sensor data capturing functions, sensor data processing functions, communication functions, vehicle driving functions, and interior vehicle functions (step 602). In response to the vehicle joining the cluster of vehicles, determining, by the data processing system, an appropriate proportion of information the vehicle is to process based on current input sensor data capturing functions, sensor data processing functions, and communication functions the vehicle is performing and current power consumption levels the vehicle is using, and current input sensor data capturing functions, sensor data processing functions, and communication functions other vehicles in the cluster of vehicles are performing and current power consumption levels the other vehicles in the cluster are using (step 604). Thereafter, the process terminates.

Figure 7B:
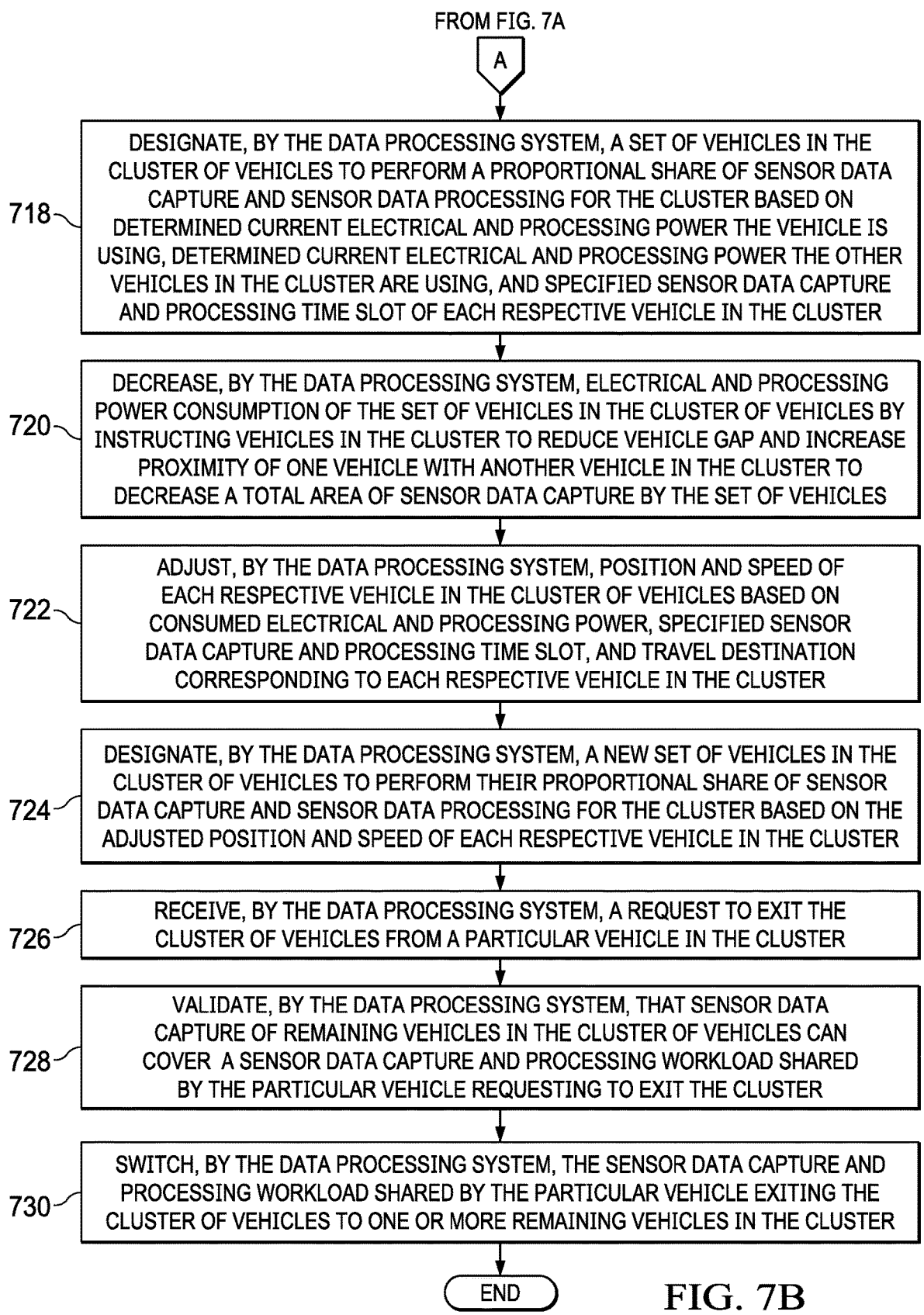

With reference now to FIGS. 7A-7B, a flowchart illustrating a process for cluster-based management of vehicle power consumption is shown in accordance with an illustrative embodiment. The process shown in FIGS. 7A-7B may be implemented in a data processing system of a vehicle, such as, for example, data processing system 116 in FIG. 1, data processing system 200 in FIG. 2, or data processing system 314 in FIG. 3.

The process begins when the data processing system receives an indication that the vehicle is joining a cluster of vehicles along a same travel route within a defined vehicle cluster length and width (step 702). The data processing system of the vehicle defines the vehicle cluster length and width based on processing power limitations of the data processing system. The data processing system determines current electrical power consumption and processing power consumption of the vehicle based on input sensor data capturing functions, sensor data processing functions, communication functions, vehicle driving functions, and interior vehicle functions the vehicle is currently using (step 704). In addition, the data processing system determines current electrical power consumption and processing power consumption of other vehicles in the cluster of vehicles based on input sensor data capturing functions, sensor data processing functions, communication functions, vehicle driving functions, and interior vehicle functions the other vehicles are currently using (step 706).

Further, the data processing system shares captured sensor data of the same travel route by the vehicle with each respective vehicle in the cluster of vehicles (step 708). The data processing system also receives shared sensor data of the same travel route from each respective vehicle in the cluster of vehicles (step 710). The data processing system performs a comparison of the captured sensor data with the shared sensor data of the same travel route (step 712). The data processing system identifies sensor data overlap based on the comparison of the captured sensor data and the shared sensor data of the same travel route (step 714).

Furthermore, the data processing system disables input sensor data capturing functions of one or more vehicles in the cluster of vehicles corresponding to the sensor data overlap to decrease electrical power consumption of the one or more vehicles (step 716). Moreover, the data processing system designates a set of vehicles in the cluster of vehicles to perform a proportional share of sensor data capture and sensor data processing for the cluster based on determined current electrical and processing power the vehicle is using, determined current electrical and processing power the other vehicles in the cluster are using, and specified sensor data capture and processing time slot of each respective vehicle in the cluster (step 718). In addition, the data processing system decreases electrical and processing power consumption of the set of vehicles in the cluster of vehicles by instructing vehicles in the cluster to reduce vehicle gap and increase proximity of one vehicle with another vehicle in the cluster to decrease a total area of sensor data capture by the set of vehicles (step 720).

The data processing system adjusts position and speed of each respective vehicle in the cluster of vehicles based on consumed electrical and processing power, specified sensor data capture and processing time slot, and travel destination corresponding to each respective vehicle in the cluster (step 722). The data processing system designates a new set of vehicles in the cluster of vehicles to perform their proportional share of sensor data capture and sensor data processing for the cluster based on the adjusted position and speed of each respective vehicle in the cluster (step 724).

The data processing system receives a request to exit the cluster of vehicles from a particular vehicle in the cluster (step 726). The data processing system validates that sensor data capture of remaining vehicles in the cluster of vehicles can cover a sensor data capture and processing workload shared by the particular vehicle requesting to exit the cluster (step 728). The data processing system switches the sensor data capture and processing workload shared by the particular vehicle exiting the cluster of vehicles to one or more remaining vehicles in the cluster (step 730). Thereafter, the process terminates.

Thus, illustrative embodiments of the present invention provide a computer-implemented method, computer system, and computer program product for decreasing electrical power and processing power consumption of vehicles in a cluster of vehicles by decreasing sensor data processing of the vehicles by the vehicles using non-duplicate sensor data provided by a designated set of one or more vehicles in the cluster. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
optimizing electrical power consumption and processing power consumption of a vehicle by dynamically determining a cluster of vehicles for the vehicle to join based on input sensor data capturing functions, input sensor data processing functions, communication functions, vehicle driving functions, and interior vehicle functions;
sharing captured input sensor data between the vehicle and one or more other vehicles of the cluster; and
responsive to the vehicle joining the cluster of vehicles, determining an appropriate proportion of information the vehicle is to process based on current input sensor data capturing functions, input sensor data processing functions, and communication functions the vehicle is performing and current power consumption levels the vehicle is using, and current input sensor data capturing functions, input sensor data processing functions, and communication functions other vehicles in the cluster of vehicles are performing and current power consumption levels the other vehicles in the cluster are using.

2. The method of claim 1 further comprising:
receiving an indication that the vehicle is joining the cluster of vehicles along a same travel route within a defined vehicle cluster length and width, the defined vehicle cluster length and width is based on processing power limitations;
determining current electrical power consumption and processing power consumption of the vehicle based on input sensor data capturing functions, input sensor data processing functions, communication functions, vehicle driving functions, and interior vehicle functions the vehicle is currently using; and
determining current electrical power consumption and processing power consumption of other vehicles in the cluster of vehicles based on input sensor data capturing functions, input sensor data processing functions, communication functions, vehicle driving functions, and interior vehicle functions the other vehicles are currently using.

3. The method of claim 2 further comprising:
sharing captured input sensor data of the same travel route by the vehicle with each respective vehicle in the cluster of vehicles;
receiving shared input sensor data of the same travel route from each respective vehicle in the cluster of vehicles; and
performing a comparison of the captured input sensor data with the shared input sensor data of the same travel route.

4. The method of claim 3 further comprising:
Identifying input sensor data overlap based on the comparison of the captured input sensor data and the shared input sensor data of the same travel route.

5. The method of claim 4 further comprising:
disabling input sensor data capturing functions of one or more vehicles in the cluster of vehicles corresponding to the input sensor data overlap to decrease electrical power consumption of the one or more vehicles.

6. The method of claim 1 further comprising:
designating a set of vehicles in the cluster of vehicles to perform a proportional share of input sensor data capture and input sensor data processing for the cluster based on determined current electrical and processing power the vehicle is using, determined current electrical and processing power the other vehicles in the cluster are using, and specified input sensor data capture and processing time slot of each respective vehicle in the cluster.

7. The method of claim 1 further comprising:
decreasing electrical and processing power consumption of a set of vehicles in the cluster of vehicles by instructing vehicles in the cluster to reduce vehicle gap and increase proximity of one vehicle with another vehicle in the cluster to decrease a total area of input sensor data capture by the set of vehicles.

8. The method of claim 1 further comprising:
adjusting position and speed of each respective vehicle in the cluster of vehicles based on consumed electrical and processing power, specified input sensor data capture and processing time slot, and travel destination corresponding to each respective vehicle in the cluster.

9. The method of claim 1 further comprising:
designating a set of vehicles in the cluster of vehicles to perform a proportional share of input sensor data capture and input sensor data processing for the cluster based on adjusted position and speed of each respective vehicle in the cluster.

10. The method of claim 1 further comprising:
receiving a request to exit the cluster of vehicles from a particular vehicle in the cluster; validating that input sensor data capture of remaining vehicles in the cluster of vehicles can cover an input sensor data capture and processing workload shared by the particular vehicle requesting to exit the cluster; and
switching the input sensor data capture and processing workload shared by the particular vehicle exiting the cluster of vehicles to one or more remaining vehicles in the cluster.

11. A computer system comprising:
a bus system;
a storage device connected to the bus system, wherein the storage device stores program instructions; and
a processor connected to the bus system, wherein the processor executes the program instructions to:
optimize electrical power consumption and processing power consumption of a vehicle by dynamically determining a cluster of vehicles for the vehicle to join based on input sensor data capturing functions, input sensor data processing functions, communication functions, vehicle driving functions, and interior vehicle functions;
share captured input sensor data between the vehicle and one or more other vehicles of the cluster; and
in response to the vehicle joining the cluster of vehicles, determine an appropriate proportion of information the vehicle is to process based on current input sensor data capturing functions, input sensor data processing functions, and communication functions the vehicle is performing and current power consumption levels the vehicle is using, and current input sensor data capturing functions, input sensor data processing functions, and communication functions other vehicles in the cluster of vehicles are performing and current power consumption levels the other vehicles in the cluster are using.

12. The computer system of claim 11, wherein the processor further executes the program instructions to:
receive an indication that the vehicle is joining the cluster of vehicles along a same travel route within a defined vehicle cluster length and width, the defined vehicle cluster length and width is based on processing power limitations;
determine current electrical power consumption and processing power consumption of the vehicle based on input sensor data capturing functions, input sensor data processing functions, communication functions, vehicle driving functions, and interior vehicle functions the vehicle is currently using; and
determine current electrical power consumption and processing power consumption of other vehicles in the cluster of vehicles based on input sensor data capturing functions, input sensor data processing functions, communication functions, vehicle driving functions, and interior vehicle functions the other vehicles are currently using.

13. The computer system of claim 12, wherein the processor further executes the program instructions to:
share captured input sensor data of the same travel route by the vehicle with each respective vehicle in the cluster of vehicles;
receive shared input sensor data of the same travel route from each respective vehicle in the cluster of vehicles; and
perform a comparison of the captured input sensor data with the shared input sensor data of the same travel route.

14. The computer system of claim 13, wherein the processor further executes the program instructions to:
identify input sensor data overlap based on the comparison of the captured input sensor data and the shared input sensor data of the same travel route.

15. A computer program product comprising a computer readable storage medium having program instructions embodied therewith, the program instructions executable by a computer to cause the computer to perform a method comprising:
optimizing electrical power consumption and processing power consumption of a vehicle by dynamically determining a cluster of vehicles for the vehicle to join based on input sensor data capturing functions, input sensor data processing functions, communication functions, vehicle driving functions, and interior vehicle functions;
sharing captured input sensor data between the vehicle and one or more other vehicles of the cluster; and
responsive to the vehicle joining the cluster of vehicles, determining an appropriate proportion of information the vehicle is to process based on current input sensor data capturing functions, input sensor data processing functions, and communication functions the vehicle is performing and current power consumption levels the vehicle is using, and current input sensor data capturing functions, input sensor data processing functions, and communication functions other vehicles in the cluster of vehicles are performing and current power consumption levels the other vehicles in the cluster are using.

16. The computer program product of claim 15 further comprising:
receiving an indication that the vehicle is joining the cluster of vehicles along a same travel route within a defined vehicle cluster length and width, the defined vehicle cluster length and width is based on processing power limitations;
determining current electrical power consumption and processing power consumption of the vehicle based on input sensor data capturing functions, input sensor data processing functions, communication functions, vehicle driving functions, and interior vehicle functions the vehicle is currently using; and
determining current electrical power consumption and processing power consumption of other vehicles in the cluster of vehicles based on input sensor data capturing functions, input sensor data processing functions, communication functions, vehicle driving functions, and interior vehicle functions the other vehicles are currently using.

17. The computer program product of claim 16 further comprising:
sharing captured input sensor data of the same travel route by the vehicle with each respective vehicle in the cluster of vehicles;
receiving shared input sensor data of the same travel route from each respective vehicle in the cluster of vehicles; and
performing a comparison of the captured input sensor data with the shared input sensor data of the same travel route.

18. The computer program product of claim 17 further comprising:
identifying input sensor data overlap based on the comparison of the captured input sensor data and the shared input sensor data of the same travel route.

19. The computer program product of claim 18 further comprising:
disabling input sensor data capturing functions of one or more vehicles in the cluster of vehicles corresponding to the input sensor data overlap to decrease electrical power consumption of the one or more vehicles.

20. The computer program product of claim 15 further comprising:
designating a set of vehicles in the cluster of vehicles to perform a proportional share of input sensor data capture and input sensor data processing for the cluster based on determined current electrical and processing power the vehicle is using, determined current electrical and processing power the other vehicles in the cluster are using, and specified input sensor data capture and processing time slot of each respective vehicle in the cluster.

* * * * *